United States Patent
Vakilimoghaddam et al.

(10) Patent No.: US 11,326,837 B2
(45) Date of Patent: May 10, 2022

(54) HEAT EXCHANGER WITH INTERNAL MANIFOLD STRUCTURE

(71) Applicant: Dana Canada Corporation, Oakville (CA)

(72) Inventors: Farbod Vakilimoghaddam, Oakville (CA); Jiang Feng Yu, Oakville (CA)

(73) Assignee: Dana Canada Corporation, Oakville (CA)

( * ) Notice: Subject to any disclaimer, the term of this patent is extended or adjusted under 35 U.S.C. 154(b) by 0 days.

(21) Appl. No.: 17/255,862

(22) PCT Filed: Jun. 19, 2019

(86) PCT No.: PCT/CA2019/050857
§ 371 (c)(1),
(2) Date: Dec. 23, 2020

(87) PCT Pub. No.: WO2020/000087
PCT Pub. Date: Jan. 2, 2020

(65) Prior Publication Data
US 2021/0254895 A1 Aug. 19, 2021

Related U.S. Application Data

(60) Provisional application No. 62/692,184, filed on Jun. 29, 2018.

(51) Int. Cl.
*F28D 1/03* (2006.01)
*H01M 10/613* (2014.01)
(Continued)

(52) U.S. Cl.
CPC .............. *F28D 1/035* (2013.01); *F28F 3/044* (2013.01); *F28F 3/12* (2013.01); *F28F 13/06* (2013.01);
(Continued)

(58) Field of Classification Search
CPC ... F28D 1/035; H01M 10/613; H01M 10/625; H01M 10/6554; H01M 10/6556;
(Continued)

(56) References Cited

U.S. PATENT DOCUMENTS 4,478,277 A * 10/1984 Friedman ............ H01M 10/613
165/185
4,574,876 A * 3/1986 Aid .......................... A61M 5/44
165/170

(Continued)

OTHER PUBLICATIONS

ISA Canadian Intellectual Property Administration, International Search Report and Written Opinion Issued in Application No. PCT/CA2019/050857, dated Sep. 3, 2019, WIPO, 10 pages.

*Primary Examiner* — Tho V Duong
*Assistant Examiner* — Raheena R Malik
(74) *Attorney, Agent, or Firm* — McCoy Russell LLP (57) ABSTRACT

A heat exchanger adapted to support a plurality of battery cells on the outer surface thereof is disclosed. The heat exchanger includes first and second plates disposed in opposed, facing relation to one another such that portions of the inner surface of the first and second plates are spaced apart from one another. A manifold region is enclosed between the first and second plates for receiving an incoming heat transfer fluid. A main fluid flow region is enclosed between the first and second plates and is configured for receiving heat transfer fluid discharged from the manifold region and transmitting the heat transfer fluid through the heat exchanger to an outlet port. At least one bypass port for establishing fluid communication between the manifold region and the main fluid flow region is disposed at a location within the manifold region that is upstream of the manifold region outlet end.

14 Claims, 7 Drawing Sheets

(51) Int. Cl.
    *H01M 10/625* (2014.01)
    *H01M 10/6554* (2014.01)
    *H01M 10/6556* (2014.01)
    *H01M 10/6568* (2014.01)
    *F28F 3/04* (2006.01)
    *F28F 3/12* (2006.01)
    *F28F 13/06* (2006.01)

(52) U.S. Cl.
    CPC ....... *H01M 10/613* (2015.04); *H01M 10/625* (2015.04); *H01M 10/6554* (2015.04); *H01M 10/6556* (2015.04); *H01M 10/6568* (2015.04); *H01M 2220/20* (2013.01)

(58) Field of Classification Search
    CPC ........... H01M 10/6568; H01M 10/222; H01M 10/20; F28F 3/12; F28F 13/06
    USPC ....................................................... 165/167
    See application file for complete search history.

(56) References Cited

U.S. PATENT DOCUMENTS

| | | | |
|---|---|---|---|
| 5,205,348 A * | 4/1993 | Tousignant | F28F 3/12 |
| | | | 165/170 |
| 6,613,472 B1 * | 9/2003 | Watanabe | H01M 10/625 |
| | | | 429/120 |
| 7,055,583 B2 * | 6/2006 | Filippi | B01J 8/0214 |
| | | | 165/145 |
| 9,103,300 B2 | 8/2015 | Tischer | |
| 9,134,079 B2 | 9/2015 | Tonkovich et al. | |
| 9,307,671 B2 * | 4/2016 | Huang | H05K 7/20727 |
| 9,437,905 B2 | 9/2016 | Boddakayala et al. | |
| 9,666,912 B2 * | 5/2017 | Obrist | H01M 10/652 |
| 10,158,151 B2 | 12/2018 | Kenney et al. | |
| 10,263,301 B2 | 4/2019 | Kenney et al. | |
| 2016/0204486 A1 | 7/2016 | Kenney et al. | |

* cited by examiner

HEAT EXCHANGER WITH INTERNAL MANIFOLD STRUCTURE

CROSS-REFERENCE TO RELATED APPLICATIONS

The present application is a U.S. national phase of International Patent Application No. PCT/CA2019/050857, entitled "HEAT EXCHANGER WITH INTERNAL MANIFOLD STRUCTURE", and filed on Jun. 19, 2019. International Patent Application No. PCT/CA2019/050857 claims priority to U.S. Provisional Patent Application No. 62/692,184, entitled "HEAT EXCHANGER WITH INTERNAL MANIFOLD STRUCTURE", and filed on Jun. 29, 2018. The entire contents of the above-listed applications are hereby incorporated by reference for all purposes.

TECHNICAL FIELD

The present disclosure relates to thermal management of rechargeable batteries within an energy storage system of a battery electric vehicle (BEV) or hybrid electric vehicle (HEV), and particularly to heat exchangers adapted for cooling rechargeable batteries.

BACKGROUND

Energy storage systems such as those used in BEVs and HEVs comprise rechargeable lithium-ion batteries. A typical rechargeable battery for a BEV or HEV will comprise a number of battery modules which are electrically connected together in series and/or in parallel to provide the battery with the desired system voltage and capacity. Each battery module comprises a plurality of battery cells which are electrically connected together in series and/or parallel, wherein the battery cells may be in the form of pouch cells, prismatic cells or cylindrical cells.

Rechargeable vehicle batteries in BEVs and HEVs generate large amounts of heat that needs to be dissipated, therefore these types of batteries or battery systems need to be cooled to extend their service life.

Liquid cooled heat exchangers can be used to manage the thermal load of these rechargeable vehicle batteries. These battery heat exchangers typically comprise "cold plate" heat exchangers or "ICE" ("inter-cell elements") plate heat exchangers. A cold plate heat exchanger is a heat exchanger having a flat upper surface upon which one or more battery cells is arranged, wherein the number of battery cells associated with each cold plate is variable and may, depending on the area of the cold plate, comprise one or more battery modules. Typically, the battery cells arranged on the cold plate will be prismatic cells or cylindrical cells, which are housed in rigid containers. For example, prismatic cells may be housed in box-like containers which are arranged in face-to-face contact with each other.

In contrast, ICE plate heat exchangers are arranged or "sandwiched" between the adjacent pouch cells or prismatic cells, the individual ICE plate heat exchangers being fluidically connected together by common inlet and outlet manifolds. Examples of cold plate heat exchangers and ICE plate heat exchangers are described in commonly assigned U.S. patent application Ser. No. 14/972,463 entitled COUNTER-FLOW HEAT EXCHANGER FOR BATTERY THERMAL MANAGEMENT APPLICATIONS (Publication No. US 2016/0204486 A1), which is incorporated herein by reference in its entirety.

Temperature uniformity across the surface of battery heat exchangers is an important consideration in the thermal management of these types of battery units or overall battery systems as temperature uniformity across the surface of the heat exchanger relates to ensuring that there is a minimum temperature differential within the individual battery cells and between adjacent battery cells of the vehicle battery. Ensuring adequate temperature uniformity is a challenging aspect of heat exchanger design since the temperature of the heat transfer fluid will increase as it travels through the heat exchanger from the inlet to the outlet removing heat from the batteries. Accordingly, the temperature of the heat transfer fluid will often be found to be higher at the outlet than at the inlet.

Flow distribution through the heat exchanger is another important consideration in the thermal management of these types of battery units or overall battery systems as flow distribution of the heat transfer fluid within the heat exchanger relates to ensuring that there is adequate flow passing through the heat exchanger in thermal contact with the battery units or cells in contact with the heat exchanger for removing heat from the batteries or battery units.

Packaging is also a concern with battery heat exchangers as constraints on available packaging space within the BEV or HEV are constantly changing. With the trend to smaller vehicles, providing battery heat exchangers that provide adequate cooling of the battery systems installed within these vehicles while meeting specific packaging requirements are in demand. Battery heat exchangers having external manifold structures are known, but tend to increase the overall height of the battery heat exchanger and require a larger portion of the heat exchanger to extend beyond the area occupied by the battery cells or battery modules.

Accordingly, there is a need for battery heat exchangers which meet the cooling requirements of the batteries and which offer reduced overall packaging space.

SUMMARY

In accordance with an aspect of the present disclosure, there is provided a heat exchanger, comprising a first plate having an inner surface and an outer surface; a second plate having an inner surface and an outer surface, wherein the first and second plates are disposed with their inner surfaces in opposed facing relation to one another and with portions of the inner surfaces being spaced apart from one another; a manifold region enclosed between the first and second plates and disposed between portions of the inner surfaces that are spaced apart from one another for receiving an incoming heat transfer fluid; a main fluid flow region enclosed between the first and second plates and disposed between portions of the inner surfaces that are spaced apart from one another, the main fluid flow region configured for receiving heat transfer fluid from an outlet end of the manifold region and transmitting the heat transfer fluid through the heat exchanger; an inlet port disposed in fluid communication with an inlet end of the manifold region for supplying the heat transfer fluid to the heat exchanger; and an outlet port disposed in fluid communication with the main fluid flow region for discharging the heat transfer fluid from the heat exchanger; wherein: the manifold region includes at least one bypass port/opening for establishing fluid communication between the manifold region and the main fluid flow region at a location within the manifold region that is upstream of the manifold region outlet end.

BRIEF DESCRIPTION OF THE FIGURES

Reference will now be made, by way of example, to the accompanying drawings which show example embodiments of the present application, and in which.

Similar reference numerals may have been used in different figures to denote similar components.

DETAILED DESCRIPTION

The heat exchangers described herein are generally flat, planar fluid-carrying panels having opposed outer surfaces, at least one of the outer surfaces being adapted for thermal contact with one or more battery cells and/or battery module(s) of a rechargeable battery of a BEV or HEV.

A heat exchanger 10 according to an example embodiment of the present disclosure is shown in FIGS. 1-7. Heat exchanger 10 comprises a first plate 12 having an inner surface 14 and an outer surface 16, and a second plate 18 having an inner surface 20 and an outer surface 22. In the subject example embodiment, the heat exchanger 10 is a "cold plate" heat exchanger in which the outer surface 16 of the first plate 12 provides a flat surface upon which one or more battery cells 2 and/or battery modules 4 are supported.

The first and second plates 12, 18 may be comprised of aluminum or alloys thereof, and may be joined together by brazing in a brazing oven. Although the first and second plates 12, 18 are shown as having the same or similar thickness, the first plate and second plates 12, 18 may have different thickness, depending on the particular structure and/or intended application of the heat exchanger 10.

Figure 1:
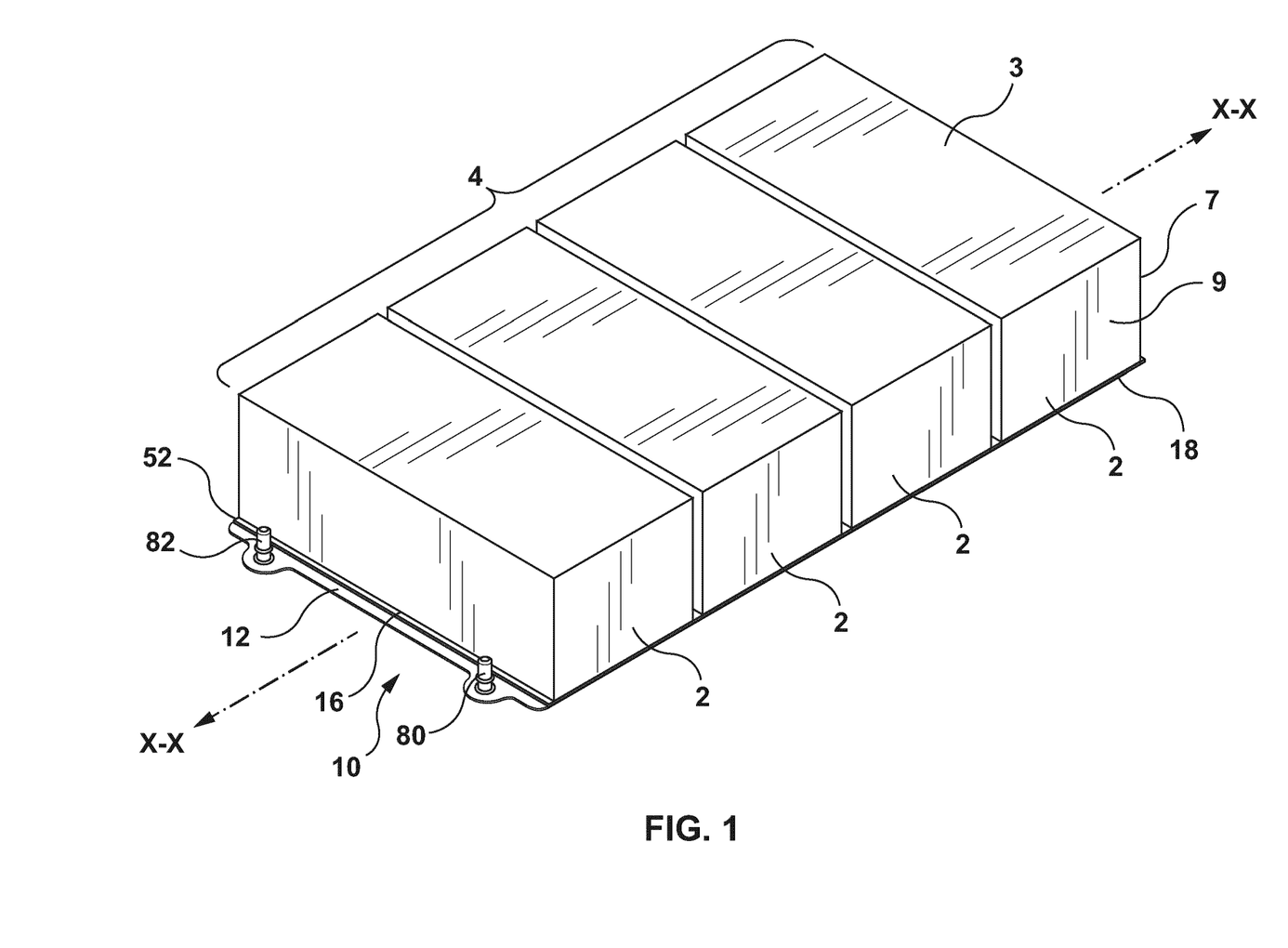
FIG. 1 is a perspective view of a battery heat exchanger with a plurality of battery cells supported on its upper surface.
Figure 2:
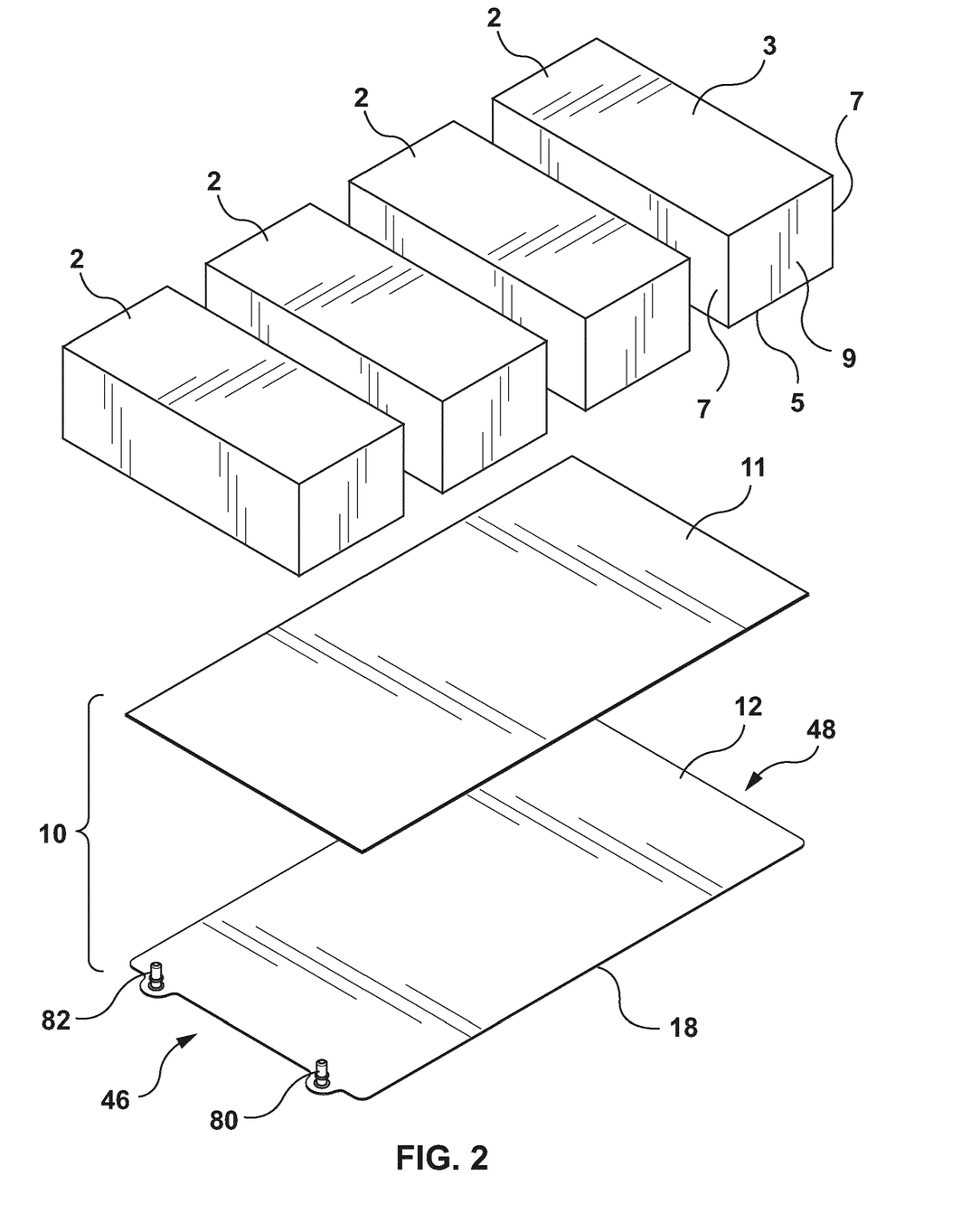
FIG. 2 is an exploded perspective view of the battery heat exchanger and battery cells of FIG. 1.
Figure 3:
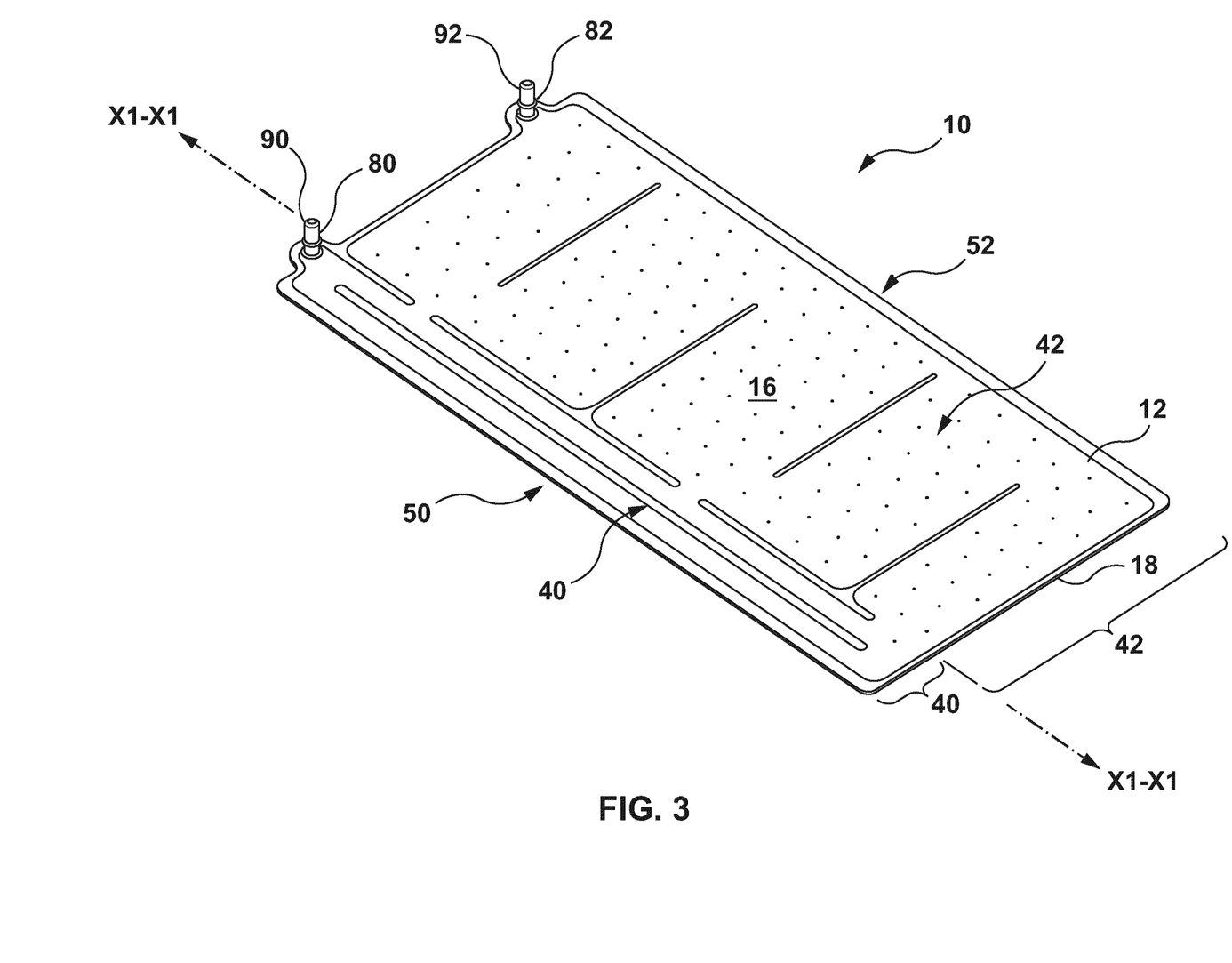
FIG. 3 is perspective view of the battery heat exchanger according to an example embodiment of the present disclosure.
Figure 4:
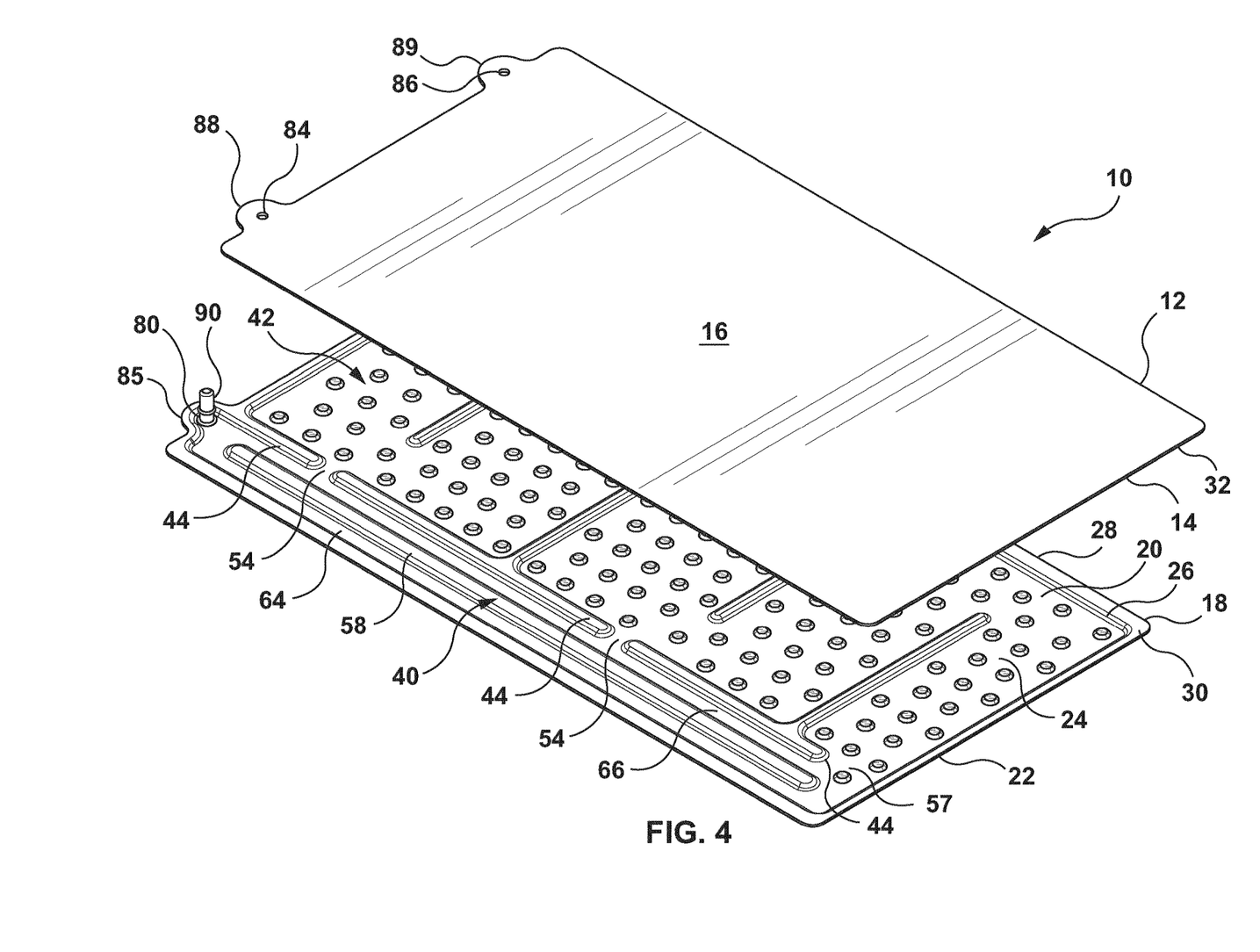
FIG. 4 is an exploded perspective view of the battery heat exchanger of FIG. 3.

FIGS. 1 and 2 schematically show a battery module 4 comprising, for example, four prismatic battery cells supported on the outer surface 16 of the first plate 12 of the heat exchanger 10. Each battery cell 2 has a plurality of rectangular surfaces, including a top surface 3, a bottom surface 5, a pair of opposed side surfaces 7, and a pair of opposed end surfaces 9. The bottom surfaces 5 are in thermal contact with the outer surface 16 of first plate 12 of the heat exchanger 10. Although not shown, the battery cells 2 are electrically connected together, and the battery module 4 is electrically connected to other battery modules of the vehicle battery. Also, the number and arrangement of the battery cells 2 and module(s) 4 supported on the heat exchanger 10 may differ from that shown. Accordingly, it will be understood that the present disclosure is not intended to be limited to a single battery module 4 comprising four prismatic battery cells 2 and that other configurations of battery module(s) and battery cells 2 are contemplated within the scope of the present disclosure. For example, in some embodiments, the battery cells 2 may be installed within a battery case or housing (not shown), which battery case is then supported on the outer surface 16 of the first plate 12 of the heat exchanger 10 in thermal contact with the outer surface 16 of the first plate 12.

A thin layer of thermal interface material (TIM) 11 is provided between the outer surface 16 of first plate 12 and the bottom surfaces 5 of the battery cells 2 to enhance thermal contact between the heat exchanger 10 and battery cells 2. A thermal interface layer 11 is illustrated schematically in FIG. 2. In some embodiments, for example, the TIM 11 may comprise a thermally conductive grease, wax or metallic material.

Figure 5:
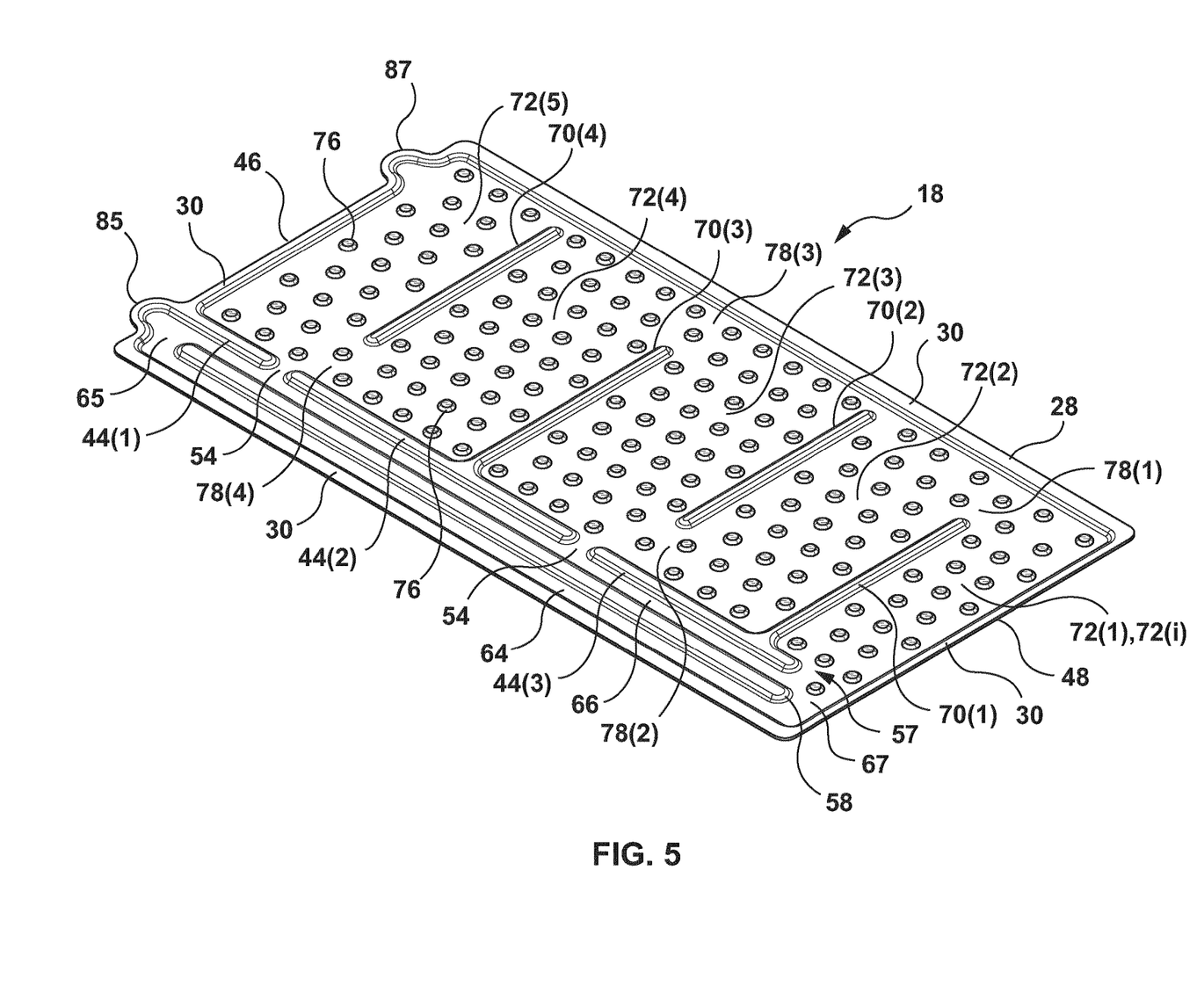
FIG. 5 is a top, perspective view of the bottom plate of the battery heat exchanger of FIG. 3.
Figure 6:
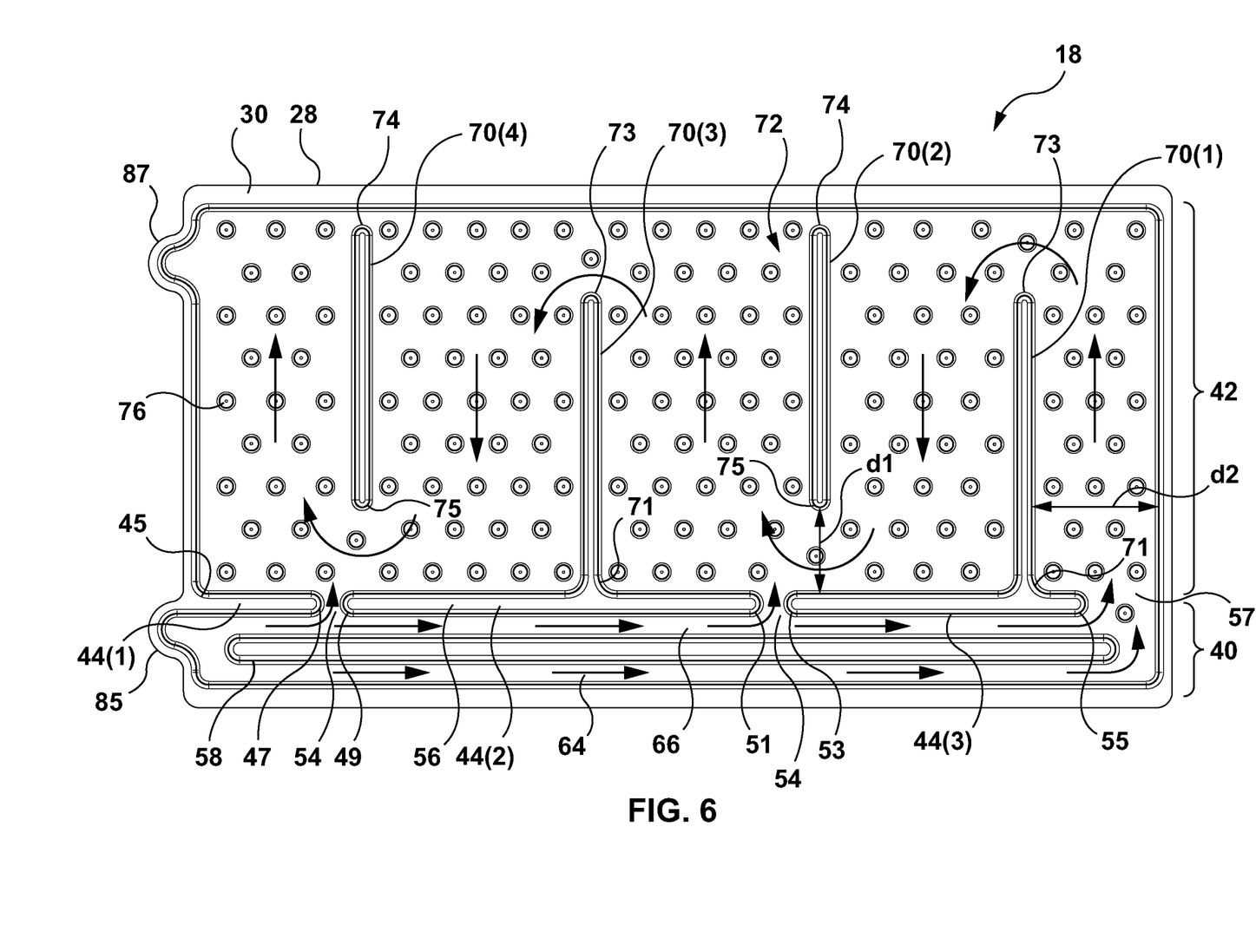
FIG. 6 is a top, plan view of the bottom plate of the battery heat exchanger of FIG. 5 including schematic flow directional arrows.
Figure 7:
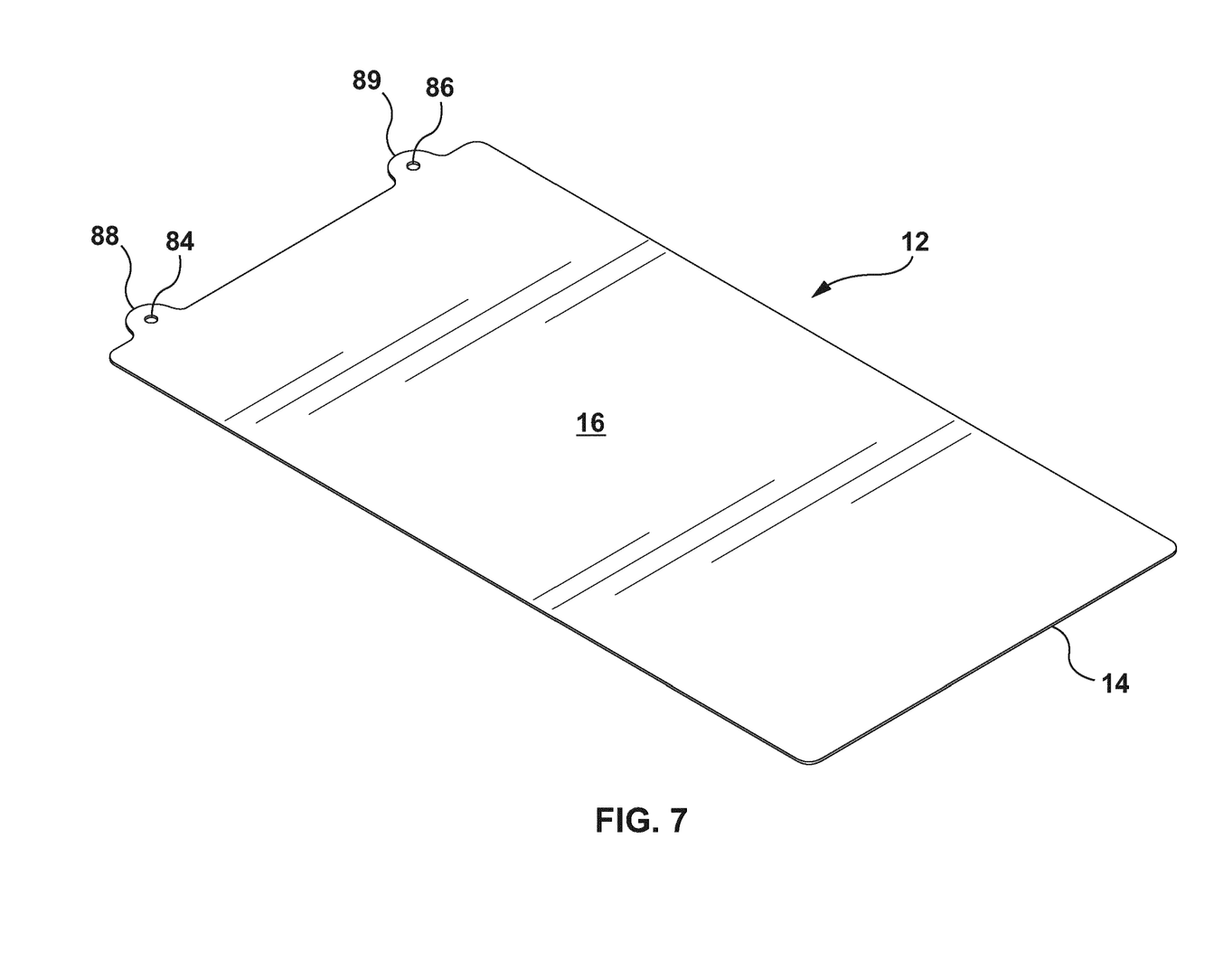
FIG. 7 is a top, perspective view of the first plate of the heat exchanger.

Referring now to FIGS. 5 and 6, there is shown an example embodiment of the second plate 18 of the heat exchanger 10. In some embodiments, for example, the second plate 18 is shaped, for example, by stamping, drawing or molding, such that it has a generally flat, planar base portion 24 surrounded on all sides by a raised peripheral sidewall 26 extending from the base portion 24 to a planar, or substantially planar, flange 28 defining a planar peripheral sealing surface 30 on the inner surface 20 of the second plate 18.

To assemble the heat exchanger 10, the first and second plates 12, 18 are disposed in a mating relationship such that the first and second plates 12, 18 are sealingly joined together with their inner surfaces 14, 20 disposed in opposed facing relation to one another such that the planar, peripheral sealing surface 30 of the second plate 18 is sealingly joined to a corresponding planar, peripheral sealing surface 32 on the inner surface of the first plate 12. Disposition of the first and second plates 12, 18 in their mating relationship is also with effect that portions of the inner surface 20 of the second plate 18 are spaced apart from the inner surface 14 of the first plate 12. More specifically, disposition of the first and second plates 12, 18 in their mating relationship is such that portions of the inner surfaces 14, 20 disposed inward of the respective sealing surfaces 32, 30 are spaced apart from one another. In some embodiments, for example, portions of the generally flat, planar base portion 24 of the second plate 18 are spaced apart from the inner surface 14 of the first plate 12 when the first and second plates 12, 18 are disposed in their mating, face-to-face relationship.

The planar base portion 24 includes a manifold region 40 and a main fluid flow region 42. A manifold rib 44 extends upwardly out of the plane of the generally flat, planar base portion 24 and defines a fluid barrier that separates the manifold region 40 from the main fluid flow region 42 of the heat exchanger 10. In some embodiments, for example, the manifold rib 44 extends parallel, or substantially parallel to a central, longitudinal axis X-X of the heat exchanger 10 and which extends between opposite first and second ends 46, 48 of the second plate 18. The manifold region 40, therefore, extends longitudinally along one of the side edges 50, 52 of the heat exchanger 10. In the example embodiment illustrated in FIGS. 1-7, the manifold region 40 extends along the front, side edge 50 of the heat exchanger 10 illustrated most clearly in FIGS. 3-6.

In some embodiments, for example, the manifold region 40 is an inlet region of the heat exchanger 10 configured for receiving the incoming heat exchange fluid while the main fluid flow region 42 is an outlet region of the heat exchanger 10 configured for transmitting the heat exchange fluid from the manifold region 40 of inlet region of the heat exchanger 10 to the heat exchanger outlet 82.

In some embodiments, for example, the manifold rib 44 includes manifold rib portions 44(1), 44(2), 44(3) that are disposed along a longitudinal axis X1-X1 that separates the manifold region 40 from the main fluid flow region 42 and extends parallel, or substantially parallel to a central, longitudinal axis X-X of the heat exchanger 10, the manifold rib portions 44(1), 44(2), 44(3) being spaced apart from each other along the longitudinal axis X1-X1 by gap portions or openings that define bypass ports 54. In the subject example embodiment, the manifold rib 44 includes a first manifold rib portion 44(1) that extends from a portion of the peripheral sidewall 26 that extends along one of the ends 46 of the heat exchanger 10 such that a first end 45 of the first manifold rib portion 44(1) is merged with a portion of the peripheral sidewall 26 and terminates at a second, free end 47 that is inwardly disposed within the open interior space defined by the heat exchanger plates with respect to the peripheral sidewall 26. A second manifold rib portion 44(2) extends longitudinally between a first, free end 49 that is spaced apart from the second end 47 of the first manifold rib portion 44(1) by a first bypass port 54 and a second, free end 51. A third manifold rib portion 44(3) extends longitudinally between a first, free end 53 that is spaced apart from the second end 51 of the second manifold rib portion 44(2) by a second bypass port 54 and a second, free end 55 which is spaced apart from the portion of the peripheral sidewall 26 that defines the second opposite end 48 of the heat exchanger 10. Each of the manifold rib portions 44(1), 44(2), 44(3) extend upwardly out of the plane of the generally flat, planar base portion 24 of the second plate 18 with sufficient height such that an upper surface of each manifold rib portion 44(i) defines a manifold rib sealing surface 56 that, in some embodiments, is co-planar with, or substantially co-planar with, the sealing surface of the planar flange 28 of the second plate 18. In some embodiments, for example, the manifold rib sealing surface 56 is a generally flat, planar surface while in other embodiments, for example, the manifold rib sealing surface 56 may be slightly rounded. The manifold rib 44, or manifold rib portions 44(1), 44(2), 44(3) that make up the manifold rib 44 define a manifold rib sealing surface 56 such that when the first plate 12 is disposed on top of the second plate 18, the inner surface of the first plate 12 is disposed in sealing engagement with the manifold rib sealing surface 56, as well as with the sealing surface defined by the planar flange 28 which sealing engagement defines the manifold region 40 and the main fluid flow region 42 of the heat exchanger 10.

In the subject example embodiment, the manifold region 40 includes a flow dividing rib 58 disposed intermediate the manifold rib 44 and the peripheral sidewall 26 that defines the corresponding side edge 50, or front side edge 50, of the heat exchanger 10. The flow dividing rib 58 is generally straight and extends parallel to, or substantially parallel to the manifold rib 44 and the side edge 50 of the heat exchanger 10 and parallel to, or substantially parallel to the central, longitudinal axis X-X of the heat exchanger 10 as well as relative to the longitudinal axis X1-X1 of the manifold rib 44. The flow dividing rib 58 extends between first and second ends 60, 62, each of which is spaced apart from the respective portion of the peripheral sidewall 26 that defines the respective ends 46, 48 of the heat exchanger 10. The flow dividing rib 58 defines first and second (or outer and inner) manifold fluid distribution channels 64, 66 within the manifold region 40. Accordingly, in the subject example embodiment, incoming heat transfer fluid enters the heat exchanger via the inlet port and travels along the first and second manifold fluid distribution channels 64, 66 from the manifold inlet end 65 disposed at the first end 46 of the heat exchanger 10 to the manifold outlet end 67 at the end of the manifold region 40 disposed at the second end 48 of the heat exchanger 10 where the fluid exits and transitions from the manifold region 40 to the main fluid flow region 42 of the heat exchanger 10. The heat exchange fluid then travels through the main fluid flow region 42 to the heat exchanger outlet.

The main fluid flow region 42 includes a plurality of spaced apart fluid barrier ribs or baffle ribs 70 which define (in combination with the inner surface 14 of the first plate or cover plate 12) a plurality of fluid flow passage portions 72(i) that, together, define a fluid flow passage 72 through main fluid flow region 42 of the heat exchanger 10. The fluid barrier ribs 70 extend upwardly out of the plane of the generally flat, planar base portion 24 with sufficient height such that an upper surface of the fluid barrier ribs 70 defines a sealing surface which is co-planar with, or substantially co-planar with, the sealing surface 30 of the planar flange 28 of the second plate 18. Therefore, in the assembled heat exchanger 10, the sealing surfaces of the fluid barrier ribs 70 are sealingly joined to the inner surface 14 of the first plate or cover plate 12 when the first and second plates 12, 18 are disposed in their mating, face-to-face relationship. The fluid barrier ribs 70 are disposed such that they extend transverse to, or substantially transverse to, the central longitudinal axis X-X of the heat exchanger 10 while being spaced apart from each other at predetermined intervals along an axis parallel to, or substantially parallel to the central, longitudinal axis X-X of the heat exchanger 10.

In order to achieve the multi-pass, switch-back-style flow path through the heat exchanger 10, the plurality of fluid barrier ribs 70 are also staggered or offset with respect to each other along an axis parallel to, or substantially parallel to the central, longitudinal axis X-X of the heat exchanger 10 such that some of the plurality of fluid barrier ribs 70 extend transverse to the central longitudinal axis X-X from a first end 71 that is merged with one of the manifold rib portions 44(i) to a second free 73 end disposed within the main fluid flow region 42 but spaced apart from the peripheral sidewall 26 forming the side edge of the heat exchanger 10 while others of the plurality of fluid barrier ribs 70 extend transverse to the central longitudinal axis X-X of the heat exchanger 10 from a first end 74 disposed proximal to, but spaced apart from the peripheral sidewall 26 forming the opposite side edge 52 of the second plate 18 to a second, free end 75 disposed within the main fluid flow region 42 but spaced apart from the manifold rib 44 by a predetermined distance d1.

Accordingly, in some embodiments, for example, the plurality of fluid barrier ribs may include a first set of fluid barrier ribs having a first end merged with a portion of the manifold rib and a second end spaced apart from a corresponding portion of the peripheral sidewall 26 of the second plate 18 that defines a side edge of the heat exchanger opposite to the manifold region 40, and a second set of fluid barrier ribs having a first end disposed proximal to the peripheral sidewall 26 of the second plate 18 that defines the side edge of the heat exchanger 10 opposite to the manifold region 40, and a second end spaced apart from the manifold rib 44, wherein the first set of fluid barrier ribs alternate with the second set of fluid barrier ribs defining a multi-pass fluid flow passage 72 through the main fluid flow region 42 of the heat exchanger 10.

In some embodiments, for example, the predetermined distance d1 by which the second, free ends 75 of the fluid barrier ribs 70 are spaced apart from the manifold rib 44 or by which the second, free ends 73 of the fluid barrier ribs 70 are spaced apart from the peripheral sidewall 26 forming the side edge 52 of the second plate 18 that is opposite to the manifold region 40, is at least a minimum distance of 10 mm to at least a maximum distance of about 60 mm. In some embodiments, for example, the predetermined distance d1 by which the second, free ends of the fluid barrier ribs 70 are spaced apart from the manifold rib 44 or spaced apart from the peripheral sidewall 26 forming the side edge of the second plate 18 that is opposite to the manifold region 40 can vary between a minimum distance of at least 10 mm to a maximum distance of at least 60 mm.

In some embodiments, for example, the predetermined distance d2 by which the fluid barrier ribs 70 are spaced apart from each other along an axis parallel to, or substantially parallel to, the central longitudinal axis X-X of the heat exchanger 10 is between a minimum distance of at least 75 mm and a maximum distance of about 115 mm. In some embodiments, for example, the predetermined distance d2 by which the fluid barrier ribs 70 are spaced apart from each other along an axis parallel to, or substantially parallel to, the central longitudinal axis X-X of the heat exchanger 10 varies with some of the fluid barrier ribs 70 being spaced apart from each other along an axis parallel to, or substantially parallel to, the central longitudinal axis X-X of the heat exchanger 10 by a distance of about 115 mm while others of the fluid barrier ribs 70 being spaced apart from each other along an axis parallel to, or substantially parallel to, the central longitudinal axis X-X of the heat exchanger 10 by a distance of about 75 mm. In some embodiments, the outermost fluid barrier ribs 70 are spaced apart from the peripheral sidewall 26 defining the end edges 46, 48 of the second plate 18 by a distance of about 75 mm while the fluid barrier ribs 70 disposed in between the two outermost fluid barrier ribs 70 are spaced apart from each other along an axis parallel to, or substantially parallel to, the central longitudinal axis X-X of the heat exchanger 10 by a distance of about 115 mm.

As shown in FIGS. 1-7, the heat exchanger 10 defines a multi-pass flow path within the main fluid flow region 42 of the heat exchanger 10. Accordingly, in some embodiments, for example, the fluid flow passage 72 includes a plurality of fluid flow passage portions 72(i) (referred to generically with reference numeral 72(i) wherein "i" represents an integer indicative of the particular one of the fluid flow passage portions), wherein the plurality of fluid flow passage portions 72(i) include a first fluid flow passage portion in fluid communication with the outlet end 67 of the manifold region 40, the first fluid flow passage portion 72(1) defining a first fluid flow passage portion width. A last one of the plurality of fluid flow passage portions 72(i) (or for example fluid flow passage portion 72(5)) is in fluid communication with the outlet port 82 of the heat exchanger 10, wherein the last one of the plurality of fluid flow passage portions 72(i) defines a last fluid flow passage portion width. One or more intermediate fluid flow passage portions, for example the fluid flow passage portions 72(2)-72(4) that are disposed between the first and last fluid flow passage portions 72(1), 72(5), are disposed between the first fluid flow passage portion 72(1) and the last fluid flow passage portion 72(5), each one of the one or more intermediate fluid passage portions, for example fluid flow passage portions 72(2)-72(4), defining an intermediate fluid passage portion width, wherein the first fluid flow passage portion width is less than the last fluid flow passage portion width and less than each of the intermediate fluid passage portion widths.

In some embodiments, for example, the intermediate fluid passage portion widths are the same.

In some embodiments, for example, the last fluid flow passage width is greater than the first fluid flow passage portion width and less than each of the intermediate fluid passage portion widths.

In some embodiments, for example, the heat exchanger 10 has an overall length, and the first fluid flow passage portion width is between about 10% to 20% of the overall length of the heat exchanger 10.

In some embodiments, for example, the first fluid flow passage portion width is less than 15% of an overall length of the heat exchanger.

In some embodiments, for example, the first fluid flow passage portion width is less than or equal to 75 mm.

In some embodiments, for example, the intermediate fluid flow passage portion width is at least 115 mm.

In some embodiments, for example, the main fluid flow region 42 of the second plate 18 includes a plurality of surface protrusions 76 that project out of the surface or plane of the generally flat, planar base portion 24 of the second plate 18 forming the main fluid flow region 42. In some embodiments, the surface protrusions 76 include a plurality of dimples distributed across the surface of each of the fluid flow passage portions 72(i) of the main fluid flow region 42. In some embodiments, for example, the surface protrusions 76 extend out of the plane of the generally flat, planar base portion 24 with a height such that an upper surface of each of the protrusions is co-planar with, or substantially co-planar with, the inner surface of the first plate 12 (or cover plate) of the heat exchanger 10 when the first and second plates 12, 18 are disposed in their mating, face-to-face relationship. Therefore, in some embodiments, the surface contact between the upper surface of the surface protrusions and the inner surface 14 of the first plate 12 provides structural support to the heat exchanger 10 in the regions of the fluid flow passage portions 72(i) where the first plate 12 spans the regions between the spaced apart flow barrier ribs 70.

Heat exchanger 10 further comprises inlet and outlet ports 80, 82. In the subject example embodiment, the inlet and outlet ports 80, 82 are disposed at a first end 46 of the heat exchanger 10 with the inlet port 80 in fluid communication with the manifold region 40 of the heat exchanger 10 and the outlet port 82 in fluid communication with the main fluid flow region 42 of the heat exchanger 10. Inlet port 80 is configured to supply heat transfer fluid to the manifold region 40 of the heat exchanger 10 while the outlet port 82 is configured to discharge the heat transfer fluid from the main fluid flow region 42 of the heat exchanger 10. The inlet and outlet ports 80, 82 each comprise corresponding apertures 84, 86 in the first plate 12 that are located inwardly of the planar peripheral sealing surface 32. Due to the particular fluid flow path or flow configuration through the heat exchanger 10, the inlet and outlet ports 80, 82 are both located along one of the edges of the first plate 12 and proximate to the first end 46 of the heat exchanger 10.

In some embodiments, for example, the second plate 18 of the heat exchanger 10 includes corresponding inlet and outlet projections 85, 87 that project outwardly from the end edge of the second plate 18 in a direction parallel to, or substantially parallel to, the central longitudinal axis X-X of the heat exchanger 10. The inlet and outlet projections 85, 87 are continuous with the flat generally planar base portion 24, peripheral sidewall 26 and peripheral sealing surface 30 of the second plate 18 and form part of the perimeter of the second plate 18. Corresponding inlet and outlet projections 88, 89 project outwardly from the end edge of the first plate 12 in a direction parallel to, or substantially parallel to, the central longitudinal axis X-X of the heat exchanger 10, such that when the first plate 12 is disposed in mating, face-to-face relationship with the second plate 18, the inlet and outlet projections 88, 89 on the first plate 12 cover the corresponding inlet and outlet projections 85, 87 on the second plate 18 with the peripheral sealing surface 30 of the second plate sealingly engaging the peripheral sealing surface 32 of the inner surface 14 of the first plate 12. In the subject example embodiment, the apertures 84, 86 are located within the inlet and outlet projections 88, 89 of the first plate 12 inwardly disposed relative to the peripheral sealing surface 30.

In some embodiments, for example, the inlet port 80 is provided with a tubular inlet fitting 90 and the outlet port 82 is provided with a tubular outlet fitting 92, the fittings 90, 92 projecting upwardly from the outer surface 16 of first plate 12, to provide flow communication between the manifold region 40 and main fluid flow region 42 of the heat exchanger 10 and a fluid circulation system (not shown) of the vehicle. The ports 80, 82 and fittings 90, 92 are located outside of, and immediately adjacent to, the area of the outer surface 16 of first plate 12 which is occupied by battery cells 2 or battery modules 4. Accordingly, by having the inlet and outlet ports 80, 82 and fittings 90, 92 located within the corresponding inlet and outlet projections 85, 87, 88, 89 on the first and second plates 12, 18 leaves the main portion or majority of the outer surface 16 of the first plate 12 free of obstructions for supporting the battery cells 2 or battery modules 4 thereon. Furthermore, by having the inlet and outlet ports 80, 82 and fittings 90, 92 located within the corresponding inlet and outlet projections 85, 87, 88, 89 on the first and second plates 12, 18 outside the area of the outer surface 16 of the first plate 12 that is occupied by the battery cells 2 or battery modules 4, and by having the manifold region 40 that distributes the incoming heat transfer fluid to the fluid flow passage 72 of the heat exchanger 10 enclosed within the first and second plates 12 as opposed to having an external manifold structure mounted on the outer surface 16 of the first plate of the heat exchanger 10, as for instance, in commonly owned U.S. patent application Ser. No. 14/972,463 filed Dec. 17, 2015 which is incorporated herein by reference, the overall package space of the heat exchanger 10 is reduced. Additionally, more of the outer surface 16 of the first plate 12 is available for contact with the battery cells 2 or battery modules 4, since the battery cells 2 or modules 4 can now extend over the internal manifold region 40 as well as the main fluid flow region 42 whereas the external manifold structures used in more conventional heat exchangers of this type typically occupy a portion of the outer surface 16 of the first plate 12.

While, in the subject example embodiment, the inlet and outlet fittings 90, 92 are shown as projecting upwardly from the outer surface 16 of the first plate 12, it will be understood that in other embodiments, the inlet and outlet fittings 90, 92 could project downwardly from the outer surface 22 of the second plate 18. As well, while the inlet and outlet ports 80, 82 have been shown as being located adjacent to one another at one end of the heat exchanger 10, it will be understood that the particular location of the inlet and outlet ports 80, 82 will depend on the particular fluid flow path or flow configuration through the heat exchanger 10. Therefore, it will be understood that the present disclosure is not intended to be limited by the particular orientation and/or location of the inlet and outlet ports 80, 82 or fittings 90, 92.

Referring now to FIGS. 5 and 6, the multi-pass flow path and the overall operation of the heat exchanger will be described in further detail below. Heat exchanger 10 is configured as a multi-pass heat exchanger which defines a switchback or snaking flow pattern of heat transfer fluid across the fluid flow passage 72 defined by the main fluid flow region 42 of the heat exchanger 10. More specifically, heat transfer fluid will enter the heat exchanger 10 through inlet port 80 and will travel through the manifold region 40 before being discharged into the main fluid flow region 42 of the heat exchanger 10. Within the manifold region 40, the heat transfer fluid will be distributed to both the first and second manifold fluid distribution channels 64, 66 of the manifold region 40. Heat transfer fluid flowing through the first or outer manifold fluid distribution channel 64 will be directed towards the second end 48 of the heat exchanger 10 and the outlet end 67 of the manifold region 40 where it will transition from the manifold region 40 to the first fluid flow passage portion 72(1) of the main fluid flow region 42 of the heat exchanger through manifold region outlet 57.

As set out above, some of the heat transfer fluid entering the heat exchanger 10 through the inlet port 80 will be distributed to and will travel towards the outlet end 67 of the manifold region 40 through the second or inner manifold fluid distribution channel 66. Heat transfer fluid travelling through the second manifold fluid distribution channel 66 has the opportunity to transition from the manifold region 40 to the main fluid flow region 42 of the heat exchanger 10 through one or more of the gap portions or bypass ports 54, as well as through the manifold region outlet 57 provided in the manifold rib 44. Accordingly, some of the heat transfer fluid entering the manifold region 40 and travelling through the second or inner manifold distribution channel 66 will pass through the first bypass port 54 and will mix with the heat transfer fluid flowing from the fourth fluid flow passage portion 72(4) of the main fluid flow region 42 and will travel on to the fifth fluid flow passage portion 72(5) and be discharged through the heat exchanger outlet. Similarly, some of the heat transfer fluid entering the manifold region 40 and travelling through the second or inner manifold distribution channel 66 will pass through the second bypass port 54 and will mix with the heat transfer fluid that is flowing from the second fluid flow passage portion 72(2) to the third fluid flow passage portion 72(3), which mixture of fluid will continue through the fluid flow path to the outlet of the heat exchanger 10. Finally, some of the heat transfer fluid entering the manifold region 40 will travel all the way along the second manifold channel of the manifold region 40 and will transition from the manifold region 40 to the first fluid flow passage portion 72(1) of the main fluid flow region 42 through the manifold region outlet 57 provided at the outlet end 67 of the manifold region 40 along with the fluid that has travelled along the first or outer fluid distribution channel 64.

In some embodiments, for example, each of the bypass ports 54 has a minimum length of at least 10 mm and a maximum length of 25 mm as measured along an axis parallel to or substantially parallel to a central longitudinal axis of the heat exchanger.

In operation, in the subject example embodiment, the majority of heat transfer fluid entering the heat exchanger 10 through inlet port 80 will travel all the way along the first and second manifold fluid distribution channels 64, 66 to the first fluid flow passage portion 72(1) via the manifold region outlet 57 at the outlet end 67 of the manifold region 40, while only a smaller portion of the incoming fluid will transition from the manifold region 40 to the main fluid flow region 42 through the bypass ports 54. The heat transfer fluid that exits the manifold region 40 and enters the main fluid flow region 42 through the manifold region outlet 57 will travel along the first fluid flow passage portion 72(1) in a first direction generally transverse to the central longitudinal axis X-X of the heat exchanger 10 and will transition from the first fluid flow passage portion 72(1) to the second fluid flow passage portion 72(2) through a first turnaround zone 78(1) disposed between the free end of the first fluid barrier rib 70(1) and a portion of the peripheral sidewall 26 that defines the side edge of the main fluid flow region 42. Once through the first turnaround zone 78(1), the heat transfer fluid will travel along the second fluid flow passage portion 72(2) in a second direction that is generally transverse to the central longitudinal axis X-X of the heat exchanger 10 and opposite to the first direction through the first fluid flow passage portion 72(1) and will transition from the second fluid flow passage portion 72(2) to the third fluid flow passage portion 72(3) through second turnaround zone 78(2) formed between the second free end of the second fluid barrier rib 70(2) and the portion of the third manifold rib portion 44(3) opposite to the second fluid barrier rib 70(2). Once through the second turnaround zone 78(2), the heat transfer fluid will travel along the third fluid flow passage portion 72(3) in the same first direction as in the first fluid flow passage portion 72(1) before turning 180 degrees through a third turnaround zone 78(3) formed between the second free end of the third fluid barrier rib 70(3) and the peripheral sidewall 26 forming the side edge 52 of the second plate 18. Once through the third turnaround zone 78(3), the heat transfer fluid will travel along the fourth fluid flow passage portion 72(4) in the same, second direction as the second fluid flow passage portion 72(2) before turning 180 degrees through the fourth turnaround zone 78(4) formed between the second end of the fourth fluid barrier rib 70(4) and enters the fifth fluid flow passage portion 72(5). The heat transfer fluid travels along the fifth fluid flow passage portion 72(5) in the same, first direction as in the first and third fluid passage portions 72(1), 72(3) before exiting the heat exchanger through outlet port 82. Accordingly, it will be understood that the heat exchanger 10 comprises a fluid flow passage 72 that includes a plurality of fluid flow passage portions 72(i) interconnected by turnaround zones 78(i) such that the heat transfer fluid flowing through one of the fluid flow passage portions 72(i) flows in an opposite direction to the heat transfer fluid flowing through an adjacent one of the plurality of fluid flow passage portions 72(i).

As heat transfer fluid flow through the fluid flow passage portions 72(i), it absorbs heat from the battery cells 2 that are disposed in thermal contact with the outer surface 16 of the first plate 12 of the heat exchanger 10. Accordingly, the temperature of the fluid flowing through the heat exchanger 10 will gradually increase as it absorbs heat generated by the battery cells 2 as it flows from the inlet port 80 to the outlet port 82 through the various fluid flow passage portions 72(i). Therefore, in general, for a conventional multi-pass heat exchanger, the temperature of the fluid in the first fluid flow path portion will be less than or lower than the temperature of the fluid flowing in the more downstream fluid flow path portions, the overall rate of heat transfer therefore decreasing over the surface of the heat exchanger. This results in temperature differences, as measured on the outer surface 16 of first plate 12 and/or the TIM 11, at various locations between the inlet port 80 and the outlet port 82. In general, the temperature uniformity (Tmax-Tmin) of the heat exchanger 10 is defined by the magnitude of these temperature differences measured at different points on the outer surface 16 of first plate 12 and/or the TIM 11. In some applications, for example, to avoid negative impacts on battery cells 2, the temperature uniformity of heat exchanger 10 must be maintained within a predetermined range. In some embodiments, for example, the temperature uniformity of the heat exchanger 10 must be maintained at 3 deg or less. In some embodiments, for example, varying fluid flow within different portions of the heat exchanger may help to reduce temperature differences across the outer surface of the heat exchanger or may help to reduce temperature variations within the individual batteries or battery cells.

Due to the particular flow path or flow configuration through the heat exchanger 10, heat transfer fluid entering the heat exchanger 10 through inlet port 80 will typically have the lowest temperature as it has yet to be brought into heat transfer relationship with the battery cells 2 supported on the outer surface 16 of the first plate of the heat exchanger 10. Once the heat transfer fluid travels through the manifold region 40 with the majority of the heat transfer fluid being distributed or delivered to the first fluid flow passage portion 72(1), the temperature of the heat transfer fluid will gradually increase as it flows through the various fluid flow passage portions 72(2)-72(5) as the fluid extracts heat from the battery cells 2. Accordingly, it will be understood that the temperature of the heat transfer fluid flowing through the last of the fluid flow passage portions 72(i) most proximal to the outlet of the heat exchanger, which, in this example embodiment, is the fifth fluid flow passage portion 72(5), will have the highest temperature as it has traversed all of the various fluid flow passage portions 72(i) extracting heat from all of the battery cells 2 in thermal contact with the heat exchanger 10 over the longest flow path through the heat exchanger 10.

In order to help ensure that the temperature differential across the outer surface 16 of the heat exchanger 10, and/or through the TIM 11, is not to such a degree that it is detrimental to the battery cells 2 in thermal contact with the heat exchanger 10, gap portions or bypass ports or openings 54 disposed in the manifold rib 44 allow heat transfer fluid that is entering the heat exchanger 10 to bypass at least a portion of the second manifold fluid distribution channel 66 and portions of the multi-pass fluid flow passage 72 thereby allowing cooler or lower temperature heat transfer fluid to mix with warmer heat transfer fluid traveling through some of the later portions or more downstream fluid flow passage portions of the fluid flow passage 72. More specifically, first bypass opening 54 is located proximal to the inlet end of the manifold region 40 and allows incoming heat transfer fluid to be directed to the last or fifth fluid passage portion 72(5) where it will mix with the heat transfer fluid flowing into the last or fifth fluid passage portion 72(5) with effect that the overall temperature of the heat transfer fluid flowing in this region of the heat exchanger 10 will be reduced. Accordingly, some of the lowest temperature fluid entering the heat exchanger 10 will be allowed to mix with the warmest fluid travelling through the final fluid flow passage portion 72(5).

In the subject example embodiment, the second bypass opening 54 is located farther downstream within the manifold region 40 from the first bypass opening and serves to direct a portion of the incoming heat transfer fluid from the second distribution channel 66 of the manifold region 40 into the fluid flow passage 72 of the main fluid flow region 42 of the heat exchanger 10 about midway through the fluid flow passage 72. In some embodiments, for example, the second bypass opening is located within the manifold region 40 so as to direct incoming heat transfer fluid into the middle portion or, in the subject example embodiment, the third fluid flow passage portion 72(3) of the fluid flow passage 72 with effect that the overall temperature of the heat transfer fluid flowing through this portion of the heat exchanger 10 is reduced.

In order to promote mixing of the lower temperature bypass flow with the heat transfer fluid flowing through the fluid flow passage 72 as it transitions through the bypass ports 54 from the manifold region 40 to the main fluid flow region 42, the first and second bypass openings 54 are each disposed slightly downstream from the corresponding fluid barrier rib 70 such that the lower temperature bypass flow enters the fluid flow passage 72 within one of the turnaround zones 78. Since the heat transfer fluid flowing through the fluid flow passage 72 tends to accelerate through the turnaround zones 78, due to the smaller or reduced area of the fluid flow passage 72 within these regions or zones, injecting the lower temperature heat transfer fluid from the manifold region 40 into a turnaround zone 78 helps to ensure more complete mixing of the lower temperature fluid with the higher temperature fluid with the effect that the overall temperature of the fluid moving on through the fluid flow passage from that transition zone 78 is reduced as compared to the temperature of the fluid that entered the transition zone 78.

Accordingly, it will be understood that the exact placement or location of the bypass openings 54 with respect to the manifold rib 44 and the fluid flow passage portions 72(i) may vary depending on the specific thermal profile of the heat exchanger 10 required for a particular application and/or based on the type of battery cells 2 that are disposed in thermal contact with the heat exchanger 10. The specific placement of the bypass ports 54 relative to the fluid flow passage portions 72 that make up the multi-pass fluid flow passage 72 may also vary depending on the specific placement of the battery cells 2 or battery modules 4 on the outer surface 16 of the heat exchanger 10 to ensure that the lower temperature incoming heat transfer fluid is permitted to bypass portions of the manifold region 40 and portions of the overall fluid flow path 72, and be directed to areas within the main fluid flow region 42 of the heat exchanger 10 found to have increased temperature so as to help provide a more uniform temperature profile across the surface of the heat exchanger 10 and to help ensure that adequate heat is removed from the batteries at various regions on the heat exchanger surface to ensure proper battery performance and to maintain battery life.

In some embodiments, in order to ensure that the incoming heat transfer fluid is distributed across the main fluid flow region 42 of the heat exchanger 10 the width of the various fluid flow passage portions 72(i) may vary with effect that the velocity of the heat transfer fluid flowing through a particular portion of the fluid flow passage 72 is increased (or decreased) depending on the desired flow pattern through the heat exchanger or desired overall performance of the heat exchanger. In the subject example embodiment, the first fluid flow passage portion 72(1) has a width that is the narrowest of all of the fluid flow passage portions 72(i) while the width of the last, or fifth fluid flow passage portion 72(5), has the second narrowest width of the remaining fluid flow passage portions 72(i). In the subject example embodiment, the three inner fluid flow passage portions that are disposed between the outermost fluid flow passage portions have the same width that is greater than the widths of the two outermost fluid flow passage portions 72(1), 72(5).

Accordingly, it will be understood that the individual widths and overall dimensions of the fluid flow passage portions 72(i) and turnaround zones 78(i) within the main fluid flow region 42 of the heat exchanger 10 may vary and/or differ between various ones of the fluid flow passage portions 72(i) and turnaround zones 78 based on the particular heat transfer requirements of a particular battery pack or unit and/or the particular placement of the battery units 2 on the outer surface of the heat exchanger 10. As well, the specific placement of the bypass ports 54 relative to the fluid flow passage portions 72(i) and the specific size of the openings forming the bypass ports 54 can be tailored to ensure than an appropriate amount of lower temperature heat transfer fluid is permitted to mix with the higher temperature heat transfer fluid travelling through a different region of the heat exchanger 10. Therefore, in some embodiments, the heat exchanger includes a manifold region 40 having at least one bypass port 54 for establishing fluid communication between the manifold region 40 and the main fluid flow region 42 at a location within the manifold region 40 that is upstream of the outlet end 67 of the manifold region 40.

Although the heat exchangers described herein are cold plates, it will be appreciated that ICE plate heat exchangers are also contemplated within the scope of the present disclosure. In this regard, an ICE plate heat exchanger may be constructed from two mirror image heat exchangers 10 as described above disposed in back-to-back relationship, for example.

While various embodiments have been described in connection with the present disclosure, it will be understood that certain adaptations and modifications of the described exemplary embodiments can be made as construed within the scope of the present disclosure. Therefore, the above discussed embodiments are considered to be illustrative and not restrictive.

What is claimed is:

1. A heat exchanger, comprising:
a first plate having an inner surface and an outer surface;
a second plate having an inner surface and an outer surface, wherein the first and second plates are disposed with their inner surfaces in opposed facing relation to one another and with portions of the inner surfaces being spaced apart from one another;
a manifold region enclosed between the first and second plates and disposed between portions of the inner surfaces that are spaced apart from one another for receiving an incoming heat transfer fluid;
a main fluid flow region enclosed between the first and second plates and disposed between portions of the inner surfaces that are spaced apart from one another, the main fluid flow region configured for receiving heat transfer fluid from an outlet end of the manifold region and transmitting the heat transfer fluid through the heat exchanger, the main fluid flow region includes a fluid flow passage comprising a plurality of fluid flow passage portions extending generally transverse to a central, longitudinal axis of the heat exchanger wherein each fluid flow passage portion is fluidically interconnected to an adjacent fluid flow passage portion by a turnaround zone such that each fluid flow passage portion defines a flow direction, wherein the flow direction of one of the plurality of fluid flow passage portions is opposite to the flow direction of an adjacent one of the plurality of fluid flow passage portions, the plurality of fluid flow passage portions each have a width, the width of a first fluid flow passage portion of the plurality of fluid flow passage portions being less than the width of remaining ones of the plurality of fluid flow passage portions;

an inlet port disposed in fluid communication with an inlet end of the manifold region for supplying the heat transfer fluid to the heat exchanger;

an outlet port disposed in fluid communication with the main fluid flow region for discharging the heat transfer fluid from the heat exchanger;

wherein the manifold region includes:

a first manifold fluid distribution channel having a first end in fluid communication with the inlet port and a second end in fluid communication with the main fluid flow region; and a second manifold fluid distribution channel separate from and extending parallel to, or substantially parallel to, the first manifold fluid distribution channel, the second manifold fluid distribution channel having a first end in fluid communication with the inlet port and a second end in fluid communication with the main fluid flow region; and at least one bypass port for establishing fluid communication between the manifold region and the main fluid flow region at a location within the manifold region that is upstream of the second end of the manifold region, wherein the at least one bypass port is disposed in fluid communication with the second manifold fluid distribution channel.

2. The heat exchanger as claimed in claim 1, wherein:
the manifold region extends along an axis parallel to, or substantially parallel to the central, longitudinal axis of the heat exchanger between the inlet end of the manifold region in fluid communication with the inlet port and the outlet end of the manifold region wherein the outlet end of the manifold region is in fluid communication with a first fluid flow passage portion of the plurality of fluid flow passage portions.

3. The heat exchanger as claimed in claim 1, comprising:
a first bypass port establishing fluid communication between the manifold region and the main fluid flow region at a location within the manifold region that is upstream of the outlet end of the manifold region; and
a second bypass port establishing fluid communication between the manifold region and the main fluid flow region at a location intermediate the first bypass port and the outlet end of the manifold region.

4. The heat exchanger as claimed in claim 1, wherein the first fluid flow passage portion width is less than 15% of an overall length of the heat exchanger.

5. The heat exchanger as claimed in claim 1, wherein the at least one bypass port has a minimum length of at least 10 mm and a maximum length of 25 mm.

6. The heat exchanger as claimed in claim 1, wherein the heat exchanger is a cold plate heat exchanger adapted to support a plurality of battery cells on the outer surface of the first plate.

7. The heat exchanger as claimed in claim 6, further comprising a layer of thermal interface material (TIM) disposed on the outer surface of the first plate, wherein the plurality of battery cells are disposed in thermal contact with the thermal interface material when the plurality of battery cells are supported on the outer surface of the first plate.

8. A heat exchanger, comprising:
a first plate having an inner surface and an outer surface;
a second plate having an inner surface and an outer surface, wherein the first and second plates are disposed with their inner surfaces in opposed facing relation to one another and with portions of the inner surfaces being spaced apart from one another;

a manifold region enclosed between the first and second plates and disposed between portions of the inner surfaces that are spaced apart from one another for receiving an incoming heat transfer fluid;

a main fluid flow region enclosed between the first and second plates and disposed between portions of the inner surfaces that are spaced apart from one another, the main fluid flow region comprising a plurality of fluid flow passage portions extending generally transverse to a central, longitudinal axis of the heat exchanger wherein each fluid flow passage portion is fluidically interconnected to an adjacent fluid flow passage portion by a turnaround zone such that each fluid flow passage portion defines a flow direction, wherein the flow direction of one of the plurality of fluid flow passage portions is opposite to the flow direction of an adjacent one of the plurality of fluid flow passage portions, wherein the main fluid flow region configured for receiving heat transfer fluid from an outlet end of the manifold region and transmitting the heat transfer fluid through the heat exchanger, wherein the plurality of fluid flow passage portions include:

a first fluid flow passage portion in fluid communication with the outlet end of the manifold region, the first fluid flow passage portion defining a first fluid flow passage portion width;

a last fluid flow passage portion in fluid communication outlet port, the last fluid flow passage portion defining a last fluid flow passage portion width; and one or more intermediate fluid passage portions disposed between the first fluid flow passage portion and the last fluid flow passage portion, each one of the one or more intermediate fluid passage portions defining an intermediate fluid passage portion width;

wherein the first fluid flow passage portion width is less than the last fluid flow passage portion width and less than each of the intermediate fluid passage portion widths;

an inlet port disposed in fluid communication with an inlet end of the manifold region for supplying the heat transfer fluid to the heat exchanger; and an outlet port disposed in fluid communication with the main fluid flow region for discharging the heat transfer fluid from the heat exchanger;

wherein the manifold region includes at least one bypass port for establishing fluid communication between the manifold region and the main fluid flow region at a location within the manifold region that is upstream of the second end of the manifold region.

9. The heat exchanger as claimed in claim 8, wherein the last fluid flow passage portion width is greater than the first fluid flow passage portion width and less than each of the intermediate fluid passage portion widths.

10. A heat exchanger, comprising:
a first plate having an inner surface and an outer surface;
a second plate having an inner surface and an outer surface, wherein the first and second plates are disposed with their inner surfaces in opposed facing relation to one another and with portions of the inner surfaces being spaced apart from one another, and wherein the second plate is a shaped plate comprising a generally flat, planar base portion surrounded by a raised peripheral sidewall, the peripheral sidewall extending from the base portion to a planar flange, wherein the planar flange includes a peripheral sealing surface, such that when the first and second plates are disposed in mating relationship with their inner surfaces in opposed facing relation to one another, the peripheral sealing surface of the second plate is sealingly joined to the inner surface of the first plate;
a manifold region enclosed between the first and second plates and disposed between portions of the inner surfaces that are spaced apart from one another for receiving an incoming heat transfer fluid;
a main fluid flow region enclosed between the first and second plates and disposed between portions of the inner surfaces that are spaced apart from one another, the main fluid flow region configured for receiving heat transfer fluid from an outlet end of the manifold region and transmitting the heat transfer fluid through the heat exchanger, the main fluid flow region includes a plurality of fluid barrier ribs, each one of the plurality of fluid barrier ribs extending transverse to, or substantially transverse to, the central longitudinal axis of the heat exchanger and being spaced apart from each other and offset with respect to one another along an axis parallel to, or substantially parallel to, the central longitudinal axis of the heat exchanger, the plurality of fluid barrier ribs include a first set fluid barrier ribs having a first end merged with a portion of the manifold rib and a second end spaced apart from a corresponding portion of the peripheral sidewall of the second plate that defines a side edge of the heat exchanger opposite to the manifold region and a second set of fluid barrier ribs having a first end disposed proximal to the peripheral sidewall of the second plate that defines the side edge of the heat exchanger opposite to the manifold region, and a second end spaced apart from the manifold rib, the first set of fluid barrier ribs alternate with the second set of fluid barrier ribs defining a multipass fluid flow passage through the main fluid flow region of the heat exchanger;
an inlet port disposed in fluid communication with an inlet end of the manifold region for supplying the heat transfer fluid to the heat exchanger;
an outlet port disposed in fluid communication with the main fluid flow region for discharging the heat transfer fluid from the heat exchanger; and
a manifold rib that extends outwardly from the generally flat, planar base portion of the second plate such that an upper surface of the manifold rib is disposed co-planar with, or substantially co-planar with the peripheral sealing surface of the peripheral flange of the second plate, the manifold rib extending parallel to, or substantially parallel to a central longitudinal axis of the heat exchanger, the manifold rib fluidically separating portions of the manifold region from the main fluid flow region;
wherein the manifold region includes at least one bypass port for establishing fluid communication between the manifold region and the main fluid flow region at a location within the manifold region that is upstream of the second end of the manifold region.

11. The heat exchanger as claimed in claim 10, wherein the manifold rib includes a plurality of manifold rib portions, wherein the manifold rib portions are spaced apart from each other forming the at least one bypass port.

12. The heat exchanger as claimed in claim 10, wherein a first bypass port is located downstream from a last one of the plurality of fluid barrier ribs by a first predetermined distance along an axis parallel to, or substantially parallel to, the central longitudinal axis of the heat exchanger.

13. The heat exchanger as claimed in claim 12, wherein a second bypass port is located downstream from one of the plurality of fluid barrier ribs upstream from the last one of the plurality of fluid barrier ribs by a second predetermined distance along an axis parallel to, or substantially parallel to, the central longitudinal axis of the heat exchanger.

14. The heat exchanger as claimed in claim 10, wherein the generally flat, planar base portion includes a plurality of surface protrusions extending out of the planar base portion.

* * * * *